United States Patent [19]

Hutchings

[11] 4,239,614

[45] Dec. 16, 1980

[54] HYDROCARBON CONVERSION PROCESS WITH ANNULAR GUARD BEDS

[75] Inventor: Le Roi E. Hutchings, Mt. Prospect, Ill.

[73] Assignee: UOP Inc., Des Plaines, Ill.

[21] Appl. No.: 968,601

[22] Filed: Dec. 11, 1978

Related U.S. Application Data

[63] Continuation-in-part of Ser. No. 898,342, Apr. 21, 1978, abandoned.

[51] Int. Cl.³ .................... C10G 47/12; C10G 65/02
[52] U.S. Cl. ............................ 208/108; 208/59; 208/112; 208/146; 422/217; 422/220
[58] Field of Search ............... 208/112, 59, 146, 108, 208/208, 209, 210; 422/217, 220

[56] References Cited

U.S. PATENT DOCUMENTS

| | | | |
|---|---|---|---|
| 2,722,501 | 11/1955 | Kassel | 208/89 |
| 3,090,667 | 3/1963 | Connellan | 208/146 X |
| 3,875,055 | 4/1975 | Grosboll et al. | 422/211 X |
| 3,958,952 | 5/1976 | Van Ginneken | 422/191 |
| 3,960,508 | 6/1976 | Bessant et al. | 422/211 |
| 3,996,015 | 12/1976 | Hutchings | 422/217 |

*Primary Examiner*—Delbert E. Gantz
*Assistant Examiner*—G. E. Schmitkons
*Attorney, Agent, or Firm*—James R. Hoatson, Jr.; John F. Spears, Jr.; William H. Page, II

[57] ABSTRACT

A hydrocarbon conversion process useful in hydroprocessing petroleum-based feedstocks. The feed stream enters the top of a reaction zone and is divided into a number of portions, each of which flows through a different annular guard bed. The feed stream enters the guard beds through both cylindrical sides and exits through the bottom of the guard beds. The feed stream is then passed through a lower and much larger catalyst bed.

4 Claims, 4 Drawing Figures

HYDROCARBON CONVERSION PROCESS WITH ANNULAR GUARD BEDS

CROSS-REFERENCE TO RELATED APPLICATION

This application is a Continuation-In-Part of my prior application Ser. No. 898,342 filed Apr. 21, 1978, now abandoned. The teachings of my prior application are incorporated herein by reference.

FIELD OF THE INVENTION

The invention relates to a hydrocarbon conversion process useful in hydroprocessing a petroleum-based feed stream. The invention more specifically relates to a petroleum refining process such as hydrocracking or hydrodesulfurization in which the feed stream is passed through a guard bed prior to being contacted with the main catalyst bed contained within a reaction zone. The invention therefore relates to processes similar to those found in Class 208 and especially those processes which utilize a catalytic reaction apparatus such as that described in Class 23-288 reclassified, now 422-217.

PRIOR ART

Those involved in the hydroprocessing of petroleum fractions and other hydrocarbonaceous materials have for a long time recognized the problems which arise when the inlet surface of a catalyst bed becomes clogged. The clogging may be due to the accumulation of a polymeric coating on the catalyst particles or to the formation of a layer or crust of fine particles and other solids which are filtered from the feed stream.

A method sometimes utilized to prevent the accumulation of solid particles in catalyst beds is to install a filtering device in the inlet conduit through which the reaction zone charge stream is transported. The disadvantages of this prior art solution to the problem are primarily the exorbitant cost of the filtering device itself and the increased cost of the associated hydrocarbon pumping system which is made necessary due to the inherently high pressure drop of the filtering devices.

The prior art has also attempted to ameliorate the problem of catalyst bed plugging by spreading the incoming reactants over a larger surface area to thereby decrease the rate of pressure drop increase and its total magnitude after any specific period of usage. This is shown in U.S. Pat. No. 3,598,539 (Cl. 23-288), which describes the use of screened baskets which are buried beneath the upper surface of a cylindrical catalyst bed. The reactants enter the baskets through screened vertical conduits which extend between the upper surface of the catalyst bed and the baskets, with the conduits themselves serving to further increase the available surface area.

In U.S. Pat. No. 3,607,000 (Cl. 23-1), there is illustrated the use of an upper basket tray containing screened passageways and also the use of internal bypass tubes which allow the reactants to flow downward past the basket tray when the pressure drop across the basket tray becomes sufficient to burst the rupture disc located at the top of the bypass tubes. A third apparatus using screens inserted within the catalyst bed is described in U.S. Pat. No. 3,888,633 (Cl. 23-284). Cylindrical perforated baskets extend downward within the catalyst bed, with the design of the baskets being improved by the inclusion of a flow restricting orifice at the open upstream end of the baskets.

Other apparatus directed to the problem of catalyst bed plugging are described in U.S. Pat. Nos. 3,006,740; 3,112,256; 3,167,399; 3,255,159; 3,469,950; 3,702,238; 3,875,055; 3,958,952 and 3,960,508.

U.S. Pat. No. 2,722,501 (Cl. 23-288F) issued to L. S. Kassel presents a hydrocarbon conversion process utilizing a reaction zone having an upper annular bed of catalyst and a lower cylindrical bed of catalyst. This reference is relevant for its use of the upper annular bed as a filtering zone. The flow and the apparatus described in this reference are however readily distinguishable from the subject process. For instance, the upper annular bed is used as a true radial flow filter with all of the fluids passing through both cylindrical screens in the same direction. Another difference is that the filtered fluid is not withdrawn through the bottom of the annular bed.

BRIEF SUMMARY OF THE INVENTION

The invention may be broadly characterized as a hydrocarbon conversion process which comprises the steps of passing a feed stream comprising hydrogen and hydrocarbonaceous reactants into the upper end of a reaction zone; dividing the feed stream into a number of portions and passing each portion through one of a plurality of separated annular beds of particulate material located within the upper one-third of the reaction zone, with the annular beds of particulate material being radially spaced apart and located at substantially the same vertical elevation within the reaction zone, and with the flow of the feed stream through each of the annular beds of particulate material being inward through both cylindrical sides of at least an upper portion of the annular bed and outward through a lower portion of the annular bed; recombining the portions of the feed stream at a point below the annular beds; passing the recombined feed stream downward through a larger cylindrical bed of catalyst; and removing a reaction zone effluent stream from a lower portion of the reaction zone. This process thereby effects the bi-directional passage of the feed stream through the upper annular beds as compared to the unidirectional flow of a radial flow reactor.

DESCRIPTION OF THE DRAWING

Referring now to FIG. 1, the cylindrical outer wall of the vessel 1 encloses three annular vertical beds of catalyst which are retained between vertical screens within an upper one-third of the vessel. An outermost annular bed of catalyst 4 is retained between the vertical cylindrical screens 2 and 3, resulting in the bed having a characteristic annular or donut-like shape. A discoid imperforate ring 5 extends from the bottom edge of the circular screen 2 to the internal surface of the wall of the vessel. A second imperforate discoid ring 17 connects the lower circular edge of the vertical cylindrical screen 3 with the lower circular edge of the vertical cylindrical screen 8. A second annular bed of catalyst 6 is confined between vertical cylindrical screens 8 and 9.

Figure 1:
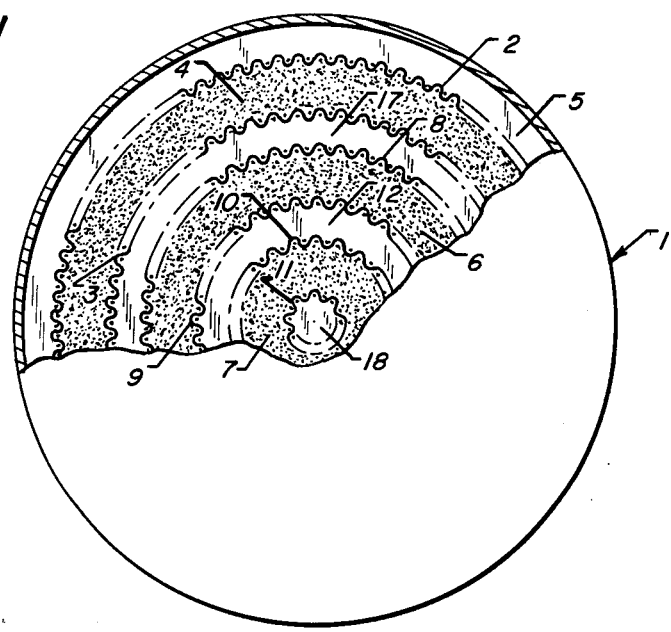
FIG. 1 is a cross-sectional view of a reaction zone useful in performing the subject process as seen along a horizontal plane and looking downward within the apparatus.

A third substantially imperforate horizontal discoid ring or band 12 extends radially inward from the lower circular edge of the vertical cylindrical screen 9 to the lower circular edge of a cylindrical screen 10. This open-centered circular ring has an overall shape similar to a washer. Screen 10 surrounds a third annular bed of catalyst 7. The innermost vertical cylindrical screen 11 forms the inner surface of the third annular catalyst bed. All of the cylindrical screens are concentric about the major vertical axis of the apparatus.

Figure 2:
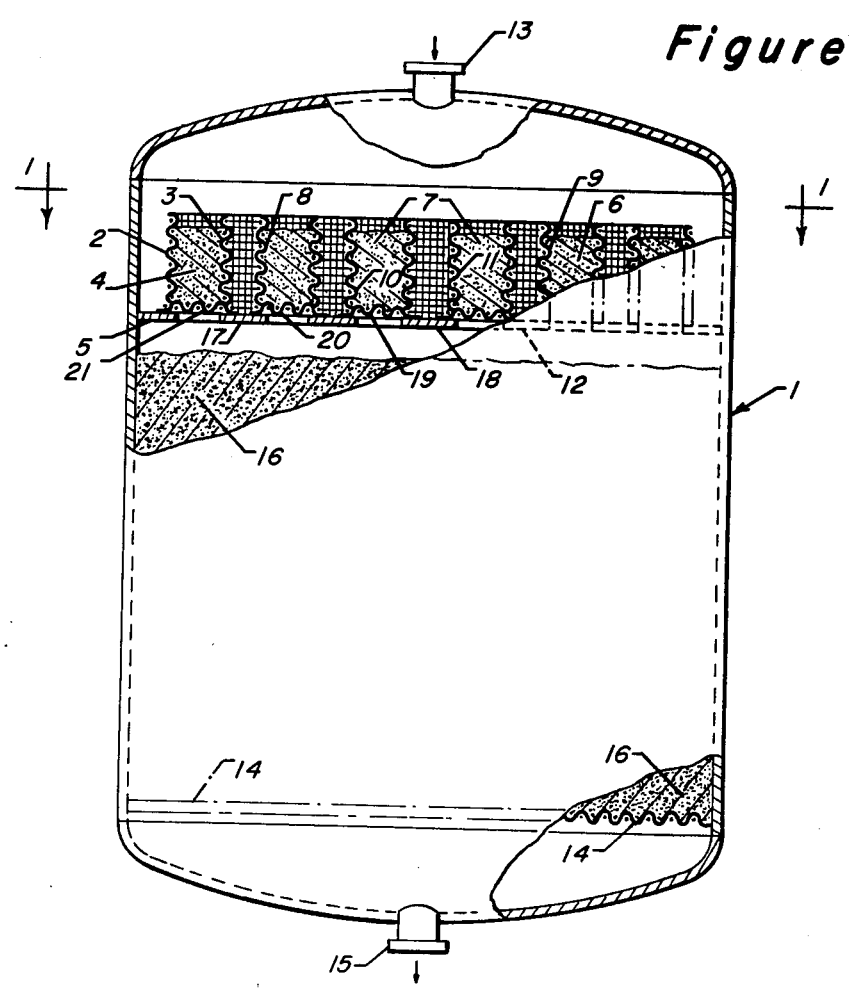
FIG. 2 is a cross-sectional view of the reaction zone of FIG. 1 taken along a vertical plane which passes through the vertical major axis of the reaction zone.

Referring now to FIG. 2, a reactant inlet conduit 13 communicates with the internal volume of the outer vessel at the upper end of the reaction zone. A fluid outlet conduit 15 is located at the bottom end of the reaction zone to allow the withdrawal of a reaction zone effluent stream. A substantially cylindrical bed of catalyst 16 is retained within the vessel above a perforate screen 14 as the main catalyst charge in the apparatus.

The two rectangular cross-sections obtained by sectioning one of the three annular catalyst beds located in the upper portion of the vessel are more clearly discernable in this view. A circular imperforate plate 18 is located at the bottom of the cylindrical screen which forms the inner wall of the innermost annular catalyst bed. A horizontal substantially imperforate discoid ring 12 separates the innermost annular catalyst bed from an intermediate annular catalyst bed 6. The outer circular edge of the circular ring 12 is adjacent to the lower circular edge of the vertical cylindrical screen 9. A horizontal perforate screen 19 is located beneath the innermost annular catalyst bed and extends between the circular plate 18 and the ring 12.

A discoid second horizontal screen 20 and a discoid third horizontal screen 21 support the middle and outermost annular catalyst beds respectively. The horizontal screens which confine the catalyst beds extend across the available cross-sectional area between the imperforate circular rings in a manner which requires all of a downwardly flowing reactant stream to pass through some portion of one of the annular catalyst beds. The outermost horizontal imperforate ring 5 extends between the circular lower edge of the vertical cylindrical screen 2 of the outermost bed and the inner surface of the outer vessel.

Figure 3:
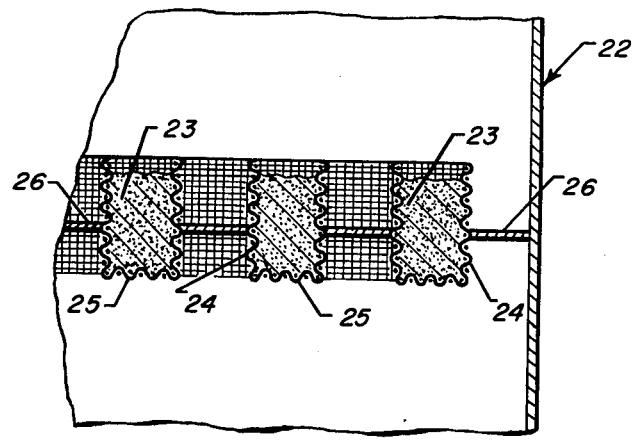
FIG. 3 is a cross-sectional view taken on a vertical plane through an upper portion of a reaction zone in which the annular particle beds extend below imperforate circular rings located between the annular beds.

In the embodiment shown in FIG. 3, the structure of the annular beds differs by the placement of the circular imperforate rings 26 at an elevation above the horizontal screens 25 which support the annular catalyst beds 23. The imperforate circular or washer-shaped rings extend across the annular void volumes located between the horizontally adjacent vertical cylindrical screens 24 of adjacent open-topped catalyst baskets. An outermost imperforate ring 26 extends radially outward from the outermost vertical screen to the inner surface of the cylindrical wall 22 of the outer vessel of the reaction zone.

Figure 4:
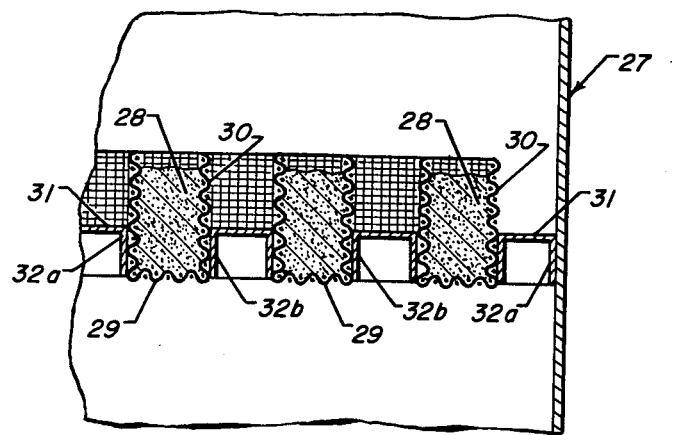
FIG. 4 is a cross-sectional view taken on a vertical plane passing through a third type of the annular particle beds used in the upper portion of a reaction zone.

FIG. 4 illustrates a reaction zone in which the annular catalyst beds 28 are contained within concentric annular baskets formed by vertical cylindrical side screens 30 and horizontal bottom screens 29. The outermost catalyst basket is spaced away from the inner surface of the cylindrical outer wall 27 of the reaction zone by the horizontal imperforate discoid ring 31. One of a pair of vertical cylindrical imperforate walls 32 extends downward from each edge of the imperforate rings to the lower edge of the cylindrical side screens 30. This produces a graduated set of open-bottomed U-shaped imperforate elements having an outer wall 32a and an inner wall 32b. This set of imperforate elements nests between and alternates with the graduated set of annular catalyst baskets.

The reaction zone shown in the Drawing has been simplified by the deletion of various pieces of equipment which are normally required and utilized in a hydrocarbon conversion reaction zone. These include such customary features as support bars extending horizontally across the internal volume of the vessel, temperature sensing means, inert ceramic spacing or filtering spheres, fluid distributors and collectors, manways, etc. These accouterments may be designed and constructed in one of the many ways which are well known to those skilled in the art. This representation of the preferred embodiment of the invention is not intended to limit the inventive concept to this specific embodiment or to exclude those other embodiments described herein or which result from reasonable and normal modification of the disclosed embodiments.

DETAILED DESCRIPTION

Numerous commercial processes involve contacting a liquid phase hydrocarbon mixture or a mixed-phase hydrocarbon mixture with a bed of solid particles for the purpose of treating or conversion of the reactants. For instance, beds of solid particulate catalyst disposed within a reaction zone have found commercial utility in the pharmaceutical, detergent, petroleum, petrochemical and heavy chemical industries. These particulate catalysts are generally employed in processes for the treating or chemical conversion of various organic compounds, and are specially utilized within the petroleum industry for the treatment and conversion of various hydrocarbon mixtures and petroleum fractions.

Regardless of the specific reaction or purpose for which the catalyst is employed, it is essential from a standpoint of commercial acceptability that the particular catalyst bed exhibit a prolonged capability for performing its intended function, as well as exhibit a high degree of activity for effecting this function. After extended periods of use, the catalysts normally become deactivated, thereby losing their capability to perform as desired. At such times, the operation of the process must be interrupted while the catalyst bed is either regenerated or replaced. Such a deactivation is seldom sudden, and it is normally indicated by a gradual decline in catalyst activity which eventually results in the catalyst being no longer active to the necessary or desired degree.

Advances in the art of catalysis have produced catalysts which are capable of adequate performance for extended periods of time. However, processes using these catalysts are often forced to prematurely shut down while the catalyst is still sufficiently active by the accumulation of a physical covering near the top of the catalyst bed. The resultant blockage of the exposed inlet surface of the catalyst bed may be formed in several different ways. For instance, the catalyst bed may accumulate solid particles contained in the entering charge stream. That is, the catalyst bed may act as a filter which removes these solid particles from the feed stream. A layer or crust of the particles therefore accumulates on the catalyst bed and gradually restricts the flow of reactants into the bed. As the layer increases in depth with further accumulation of particles or polymers, the plant's production capacity is restricted. This is due to the inability of the hydrocarbon feed pumping system to overcome the flow restriction present at the inlet of the catalyst bed. The result is a troublesome, costly, premature stoppage of the operation of the plant for the removal of the particulate layer.

The plugging of the inlet surface of a catalyst bed is often very troublesome during the hydrodesulfurization or hydrocracking of petroleum stocks. In these processes, the partially or totally vaporized feedstock will carry suspended solid particulate matter, such as finely divided oxides of iron, pipe scale, dirt, catalyst particles from upstream processes, etc. Hydrocarbonaceous liquids derived from coal, tar sands or oil shales can also be expected to contain particulate matter such as particles of ash, rock or coal. Heavier oils, by virtue of their high viscosities, are capable of retaining even larger particles in suspension than are the lighter oils and therefore cause the most severe catalyst bed plugging problems experienced by oil refiners.

The inlet surfaces of catalyst beds also tend to become plugged during the hydrogenation of feed streams containing olefinic hydrocarbons. An example of this is the hydrogenation of pyrolysis liquids described more fully below. The plugging which occurs in this process is due to the accumulation of a polymeric or hydrogen-deficient film in the reactant passageways rather than particle accumulation.

It is an objective of the present invention to provide a hydrocarbon conversion process which is useful in processing feed streams having a tendency to clog the inlet surface of catalyst beds. It is another objective of the present invention to provide a hydrocarbon conversion process for hydroprocessing petroleum-type feedstocks. A further objective is to provide a process for hydrodesulfurization or hydrocracking of particulate-containing petroleum-type feedstocks. It is yet another objective of the invention to provide a hydrocarbon conversion process for processing olefinic hydrocarbon-containing feedstocks.

The subject process is performed through the use of a reaction zone housed within a cylindrical vertical outer vessel similar to many process vessels commonly used in the petroleum and chemical industries such as reactors, separators,, etc. This outer vessel will be constructed of the appropriate materials after due consideration is given to the pressures, temperatures and materials to be encountered within the apparatus. The outer vessel and other elements of the invention may, in some instances, be formed from reinforced plastics or other composite materials, but is preferably constructed from a metal such as carbon or stainless steel when used as a reactor. If the vessel is to be pressurized, it should be designed in accordance with the appropriate pressure vessel code. Any reference made herein to the term "upper portion of the reaction zone" is intended to indicate the upper one-third of the vessel, with all measurements being made in terms of the height of the internal volume of the vessel along the vertical central axis of the vessel.

The lower portion of the reaction zone will contain one or more cylindrical beds of catalyst. The volume of catalyst contained within any one of these beds is preferably at least four times greater than the total volume of particulate material contained in the higher annular beds. The catalyst may have several different shapes such as a pellet, sphere or extrudate. It is preferably spherical with an outer diameter of about 1/16-inch to about ⅜-inch. This catalyst may rest upon and/or be covered by a layer of inert ceramic spheres. The catalyst beds in the lower portion of the vessel preferably are cylindrical in shape and extend across substantially the entire cross-sectional area of the internal volume of the vessel. The particulate material contained in the upper annular beds need not be a catalyst, but preferably it is the same catalyst which is present in the lower cylindrical bed.

The present invention is particularly adaptable for use with the processes of hydrodesulfurization and hydrodemetallization of petroleum fractions, the hydrogenation of olefinic materials and the hydrogenation of liquids derived from coal, tar sands or oil shale. These processes are not novel, and there exists a large body of prior art as to their operation. Those skilled in the art are therefore well equipped to practice these processes. Nevertheless, a more detailed description of these processes will be provided to aid in the understanding of what these processes are intended to include and how the invention is adapted to their practice.

U.S. Pat. Nos. 3,161,586; 3,215,618; 3,537,981 and 3,537,982 describe processes for the hydrogenation of feed streams containing polymer-forming deleterious olefinic materials. As used herein, the term "olefinic materials" includes a wide variety of unsaturated hydrocarbons including olefins, conjugated diolefins such as butadiene and styrene, and indenes. These compounds are often found for instance in pyrolysis liquids, distillates from fluid cokers, coke oven light oils and coal gasification side-product liquids. They are not commonly found in large amounts in raw petroleum fractions and normally result from prior processing, especially high temperature non-catalytic processing.

Heating a feed stream which contains olefinic materials tends to cause the formation of a polymeric coating on any apparatus which the feed stream contacts. This apparatus may be a heat-exchanger or the exposed surfaces within the reactor. The hydrogenation of these feed streams therefore is normally conducted at a relatively low temperature. Satisfactory conversion conditions for a low temperature hydrogenation reactor loaded with the preferred palladium-containing catalyst include a temperature in the broad range of from 250° F. to 500° F. Preferably, the reactor is operated at from 270° F. to 400° F.

On-stream hydrogenation conditions also include a pressure in the broad range of from about 100 psig. to about 1200 psig., a liquid hourly space velocity in the range from about 1 to 8 based on the combined charge, and a molar excess of hydrogen, typically in the range of from 500 to 2000 standard cubic feet of hydrogen per barrel of combined charge. Other operating techniques, such as the recycle of various treated streams and the use of diluents to reduce the diene value of the feed stream are known to those skilled in the art and are described in detail in the references cited above. The preferred hydrogenation catalyst comprises spheres of lithiated alumina containing from 0.05 wt.% to about 5.0 wt.% palladium. Preferably, the catalyst consists of 1/16-inch alumina spheres containing about 0.4 wt.% palladium and about 0.5 wt.% lithium.

The inventive concept may be applied to any process within in a broad field of hydroprocessing. This broad field of refining technology is often divided into three main subdivisions. The first is hydrotreating, wherein small amounts of materials including sulfur and nitrogen contained in various organic molecular structures are removed from the charge stock with very little molecular cracking. The second subdivision is hydrocracking, wherein at least 50 percent of the charge stock is cracked into components having a lower molecular weight, such as the production of a naphtha from a heavy distillate. Hydrorefining is between these two extremes and results in molecular changes to up to 10 percent or more of the feed together with impurity removal. There is a net chemical consumption of hydrogen in each of these three types of hydroprocessing. The hydrocarbonaceous reactants passed into the reaction zone will preferably have a 90 percent boiling point greater than 380° F.

The method of manufacture or the composition of the catalyst used in the reactor during the hydroprocessing operation is not critical. The catalyst may therefore be any suitable commercially available catalyst or one of proprietary nature. These catalysts are normally formed as a sphere by an oil drop method such as that demonstrated in U.S. Pat. No. 2,774,743 or extruded or pelleted. Basic to the manufacture of a large majority of all hydroprocessing catalysts is the incorporation of a metal of Group VIII of the Periodic Table on a refractory inorganic oxide carrier by coprecipitation or impregnation. The more commonly used metals from this group are iron, cobalt, nickel, platinum and palladium. In addition, metals from Group VI-A such as chromium, molybdenum or tungsten are also often compounded into the catalyst. The carrier material may be natural or synthetic and will normally be selected from alumina, silica or zirconia or combinations of any of these materials, particularly alumina in combination with one or more of the other oxides. A preferred catalyst composition is from 1-20 wt.% cobalt and from 0.1-10.0 wt.% molybdenum supported on alumina spheres. A more detailed listing of suitable catalyst composition and manufacturing techniques may be obtained by reference to U.S. Pat. Nos. 3,203,889; 3,254,018; 3,525,684 and 3,471,399.

The conversion conditions necessary for a hydroprocessing operation are determined by such factors as the charge stock, the catalyst used and the desired result of the process. A broad range of hydroprocessing conditions includes a temperature of from about 500° F. to 1000° F., a pressure of from 300 psig. to 4000 psig., and a liquid hourly space velocity of 0.1 to about 8.0. The exact reactor temperature required is determined by such factors as the initial activity and prior use of the catalyst. More specific examples of reaction conditions are contained in the above-listed United States Patents. As a general rule, the preferred operating pressure will increase with the boiling point of the material being processed. In all hydroprocessing operations, hydrogen is circulated through the reactor at a rate of about 500 to about 10,000 standard cubic feet per barrel of charge material.

The subject apparatus is especially useful in the hydroprocessing of heavy petroleum stocks such as residual oils or black oils. These feed materials often have boiling points, as determined by the appropriate ASTM distillation procedure, above about 600° F. at 1 atmosphere of absolute pressure. They will normally contain appreciable amounts of sulfur and various metals, such as iron, nickel and vanadium. The fluid stream passed through the reactor may therefore be formed by the admixture of hydrogen into various petroleum streams such as an atmospheric tower bottoms, a vacuum tower bottoms (vacuum residuum), topped crude oils, coal oil extracts, shale oils and heavy oils recovered from tar sand.

One embodiment of the invention may be characterized as a hydrocarbon conversion process which comprises the steps of passing a feed stream comprising hydrogen and hydrocarbonaceous reactants into an upper portion of a reaction zone maintained at hydrocarbon conversion conditions; dividing the feed stream into a number of portions, with each portion passing through a separate annular-shaped bed of particulate material, the annular beds of particulate material being radially spaced apart, concentric about the vertical major axis of the reaction zone and at substantially the same vertical elevation; recombining the portions of the feed stream and passing the feed stream downward through a cylindrical bed of catalyst to effect the formation of a reaction zone effluent stream removed from a lower portion of the reaction zone.

In the upper portion of the reaction zone used in the subject process, each of two or more annular beds of particulate material is confined within one of a set of horizontal circular baskets. Preferably, there are three or four annular particle beds of approximately equal width. The outer and inner diameters of the baskets are graduated. The particulate material in these upper beds may be the same or different than that used in the lower cylindrical particle beds. It is preferred that the annular beds contain an adsorbent or catalyst similar to that used in the lower beds in order to more fully utilize the available space within the vessel.

As shown in FIG. 2, each side of the annular bed has a highly rectangular cross-section when viewed along a vertical plane which passes through the center of the vessel. Preferably, the height of this cross-section, and therefore of the particle bed, is greater than its width. The height to width ratio of the cross-section of the bed may range from 1:1 to about 3:1. Each annular bed is confined to a circular basket having two porous vertical sides and a porous horizontal bottom. The vertical sides are cylindrical and give each of the upper particle beds a characteristic open-centered annular or donut-like shape. It is preferred that the tops of the upper particle beds are not covered or enclosed, as by a fourth porous screen. The sides of the circular particle baskets are referred to herein as cylindrical screens. When referring to the position of these screens and other elements of the apparatus, the relative directional terms such as "inner" and "outer" are based on distance measurements from the major or central vertical axis of the vessel. "Inner" refers to being radially closer to this major axis.

The vertical and horizontal particle-retaining screens used to confine the annular catalyst beds may be formed from several different types of commercially available material. The screening material now used in other contacting apparatus may be utilized in the subject invention. These screening materials include woven wire screens and perforated thin gauge sheeting. Another form of particle retention screen is formed by welding a great many rectangular or wedge-shaped strips to perpendicular connecting strips. Narrow open spaces are provided between the parallel strips which form the particle-contacting face of the assembled screen. These open spaces, and the perforations in other types of screening materials, are smaller than the particles forming the beds. The screens should, however, have a large total open area to provide for relatively easy and unrestricted fluid flow. Similar screening material may be used below or within the cylindrical lower particle beds.

The annular particle beds are radially spaced apart by substantially imperforate circular rings or bands. These discoid rings have circular inner and outer edges which are adjacent to and/or connected to the lower edges of the cylindrical particle-retaining screens. The shape of each individual imperforate ring resembles that of a huge washer. The imperforate rings lay in a horizontal plane perpendicular to the central major axis of the outer vessel, as do the horizontal screens at the bottom of the annular catalyst beds. The horizontal screens and the imperforate rings may be at the same elevation. They may be supported by a single network of horizontal girders extending across the internal volume of the vessel.

The structures shown in FIGS. 3 and 4 are preferred. This positioning of the imperforate rings above the bottom of the particle beds increases the minimum distance which the fluids must travel through the particle beds. The filtering or treating action of the annular beds should therefore be more effective than that provided by the structure shown in FIG. 1. As an alternative structure, the cylindrical side screens 30 of FIG. 4 may terminate at the upper edge of the imperforate vertical walls 32 rather than extending downward to the bottom screens 29. The annular particle baskets may therefore have side walls which have a perforate upper section and an imperforate lower section. It is preferred that the lower imperforate section, or the alternative separate imperforate walls, do not extend upward above the vertical midpoint of the particle beds.

Both the circular horizontal screens and the circular imperforate rings are concentric about the central major axis of the vessel. The width of the imperforate rings, as measured between the inner and outer circular edges of the rings, is preferably less than that of the annular particle beds. The width of each ring determines the void space between adjacent annular particle beds. This space may be the minimum considered necessary to allow long-term sustained flow of the unprocessed fluid stream and accordingly may be as little as one-fifth the width of the adjacent annular particle beds.

A circular imperforate center plate or disk is located at the middle of the innermost annular particle bed. This center plate is constructed in a manner similar to the imperforate rings with the obvious exception of no open center. The circular plate and the imperforate rings may be formed from metal plates of the appropriate thickness and metallurgy in a manner similar to that now used to form other apparatus and well known in the appropriate art. When viewed from above, the pattern presented by the alternating particle baskets and imperforate rings should resemble a large target similar to those used in archery.

As an alternative, the circular center plate may be deleted and the innermost or center particle bed used in the upper portion of the vessel may be cylindrical in shape. In this embodiment of the invention, the diameter of this cylindrical particle bed is preferably about equal to the width of the annular particle beds. The use of a circular center plate is preferred since it provides a convenient manway location.

The imperforate rings and the various particle-retaining screens will normally be assembled from smaller subsections after the outer vessel is permanently mounted in its vertical position. These smaller subsections may be welded or bolted together and also to the horizontal framework of cross members by which they are supported. The total structure resembles a tray or platform and extends across the total horizontal cross-sectional area of the vessel in a manner which requires all downward flowing fluids to pass through one of the particle beds located on the tray before reaching the lower cylindrical beds. Bypass conduits equipped with rupture disks may be provided to allow fluids to avoid the upper annular particle beds when the overall pressure drop through the several annular particle beds becomes excessive. These bypass conduits may be similar to those described in the cited references. The outlet ends of the bypass conduits may be located above the large cylindrical particle beds in the lower portion of the vessel or above a second tray-like assembly which supports a second set or layer of annular particle beds.

Fluid distributors may be located above the annular particle beds to uniformly spread the entering fluids over the annular beds and imperforate rings. The exact form of the apparatus which is suited to this task depends on the relative amounts of vapor and liquid in the entering fluid stream. This stream may vary from a totally vapor phase stream to a liquid phase stream. Suitable structures for these devices are known to those experienced in reactor and vessel design. Examples include a group of concentric frusto-conical elements centrally located below the inlet conduit's opening and a perforated horizontal plate extending across the cross-section of the vessel above the annular particle beds. Other equipment which is customarily used in reactors or adsorption chambers such as liquid collectors, quench distributors, vapor-liquid mixers and particle support screens at the outlet of the vessel may be provided as required.

As used herein, the adjective "annular" is intended to indicate the specified item has two sides formed at least in part by a pair of concentric parallel cylinders which have different diameters. The term "discoid" is intended to specify the characterized element is flat and has a circular outer edge.

I claim as my invention:

1. A catalytic hydrocarbon conversion process to more efficiently prevent plugging of the inlet surface of the catalyst bed which comprises the steps of:
   (a) passing a feed stream comprising hydrogen and hydrocarbonaceous reactants into an upper end of a reaction zone maintained at hydrocarbon conversion conditions;
   (b) dividing the feed stream into a number of portions and passing each portion through one of a plurality of separated annular beds of particulate material located within the upper one-third of the reaction zone, with the annular beds of particulate material being radially spaced apart, concentric about the vertical major axis of the reaction zone and located at substantially the same vertical elevation within the reaction zone, and with the flow of the feed stream through each of the annular beds of particulate material being inward through both cylindrical sides of at lease an upper portion of the annular bed and outward through a lower portion of the annular bed;

(c) recombining the portions of the feed stream at a point below the annular beds of particulate material;

(d) passing the feed stream downward through a cylindrical bed of catalyst which is at least four times greater in volume than the particulate material contained within the annular beds; and, (e) removing a reaction zone effluent stream from a lower portion of the reaction zone.

2. The process of claim 1 further characterized in that the hydrocarbonaceous reactants have a 90 percent boiling point greater than 380° F.

3. The process of claim 1 further characterized in that the catalyst comprises a Group VI-A or Group VIII metal component and in that there is a net chemical consumption of hydrogen within the reaction zone.

4. The process of claim 3 further characterized in that the particulate material in the annular beds is catalyst of the same composition as that in the cylindrical bed of catalyst.

* * * * *